UNITED STATES PATENT OFFICE.

JOHN JAMES ARMSTRONG, OF HONOLULU, TERRITORY OF HAWAII, ASSIGNOR OF ONE-HALF TO ALEXANDER G. HAWES, OF HONOLULU, TERRITORY OF HAWAII.

SUGAR PRODUCT AND METHOD OF PRODUCING THE SAME.

1,154,557.   Specification of Letters Patent.   Patented Sept. 21, 1915.

No Drawing.   Application filed December 13, 1913.   Serial No. 806,420.

*To all whom it may concern:*

Be it known that I, JOHN JAMES ARMSTRONG, a citizen of the United States, residing at Honolulu, county of Honolulu, and Territory of Hawaii, have invented certain new and useful Improvements in Sugar Products and Methods of Producing the Same; and I do hereby declare the following to be a full, clear, and exact description of the invention, such as will enable others skilled in the art to which it appertains to make and use the same.

This invention relates to a process of preparing raw sugars for shipment to refineries, and is particularly applicable to raw cane sugars. Its objects are, to reduce the cost of bags or containers, to prevent the losses which occur through the breakage of the containers, and to improve the keeping quality of the sugar by preventing inversion losses during shipment.

The present method of shipping the raw sugars from the mills to the refineries is in containers, which usually consist of jute bags, or other materials, thus entailing a very considerable expense, and losses which average about 1% to 2% through the breakage of these containers, and there is also an average loss of about 1% due to the drop in polarization during shipment.

My invention contemplates, compressing the raw sugar into cubes or blocks, preferably provided with recesses in their sides for convenience in handling, and having their corners and edges well rounded, the said cubes or blocks preferably to weigh 100 pounds each. They may either be covered with a light inexpensive covering, such as cheese cloth or suitable paper, for example, or the usual bagging may be used, to prevent losses from surface scratches and to keep the sugar clean, or they may be shipped without any covering.

It has been found by experiment that the raw cane sugars as made in the Hawaiian mills can be compressed to about 50% of its original volume, and that the resulting mass becomes very tenacious and is not easily cracked or broken by ordinary handling, and so becomes an ideal form for shipment.

Any suitable form of apparatus may be employed for compressing the raw sugar into cubes or blocks of any other convenient shape. The raw sugar may be compressed within the container. Shipping or trade marks and the like may be impressed in the blocks during their manufacture.

When the raw cane sugar is thus compressed, a hard skin is formed on the outside of the blocks or cubes, which prevents the sugar from being infected by bacteria and prevents the action of any bacteria which require air in order to become active. The surfaces in contact with the air in these compressed cubes or blocks is estimated to be only about one-two hundredth of that of the same quantity of sugar in the present bagged form, thus presenting less surface for the absorption of moisture and for the action of detrimental bacteria. The storage capacity of present warehouses, as well as the carrying capacity of the transportation steamers, can thus be greatly increased, on account of the reduction in bulk by compression of the raw sugars.

After arrival at the refinery the cubes or blocks are broken in order to facilitate or hasten the remelting, which is the first step in the process of sugar refining.

I am aware that it is old to mold, press and then dry by heat, to prepare refined, but not raw, sugars for crushing for consumption, as is shown in Patent #75,656, and Reissue #3,540, to Claus Spreckels, for example; but my process as herein described for preparing raw sugars for shipment to refineries, in so far as I have been able to ascertain, is novel and has never heretofore been done. The only sugars which are now pressed for consumption are refined sugars, which depend upon a binder to cement the granular sugar together. This binder is made of melted refined sugar and is technically called white liquor. This pressed sugar is dried in a drier to further bind the grains together by drying out this white liquor or binder. It is necessary to use a binder and dry the sugar after pressing, for the reason that the granulated refined sugar crystals are washed free of syrup or molasses and would not hold together after pressing. Further, the pressure used in pressing refined sugars is small, probably never exceeding one or two pounds per square inch, whereas, in compressing the raw sugars I employ pressures up to 2000 pounds per square inch. I do not mix the raw sugar with a binder previous to pressing, for the syrup or molasses which covers the grains or crystals of all raw sugars is sufficient for the purpose of binding the raw sugar together after pressing. Furthermore, I do not dry the raw sugars after compressing for the purpose of making a more stable article, for, with the high pressures I employ for compressing, it has been demonstrated by repeated experiments that it is entirely unnecessary to dry the cubes or blocks after they have been thus formed.

I claim:

1. The process of preparing raw sugar for shipment which consists of heavily compressing the raw sugar into the form of large blocks to materially reduce the volume per unit of weight of said sugar and to form a protective shell-like surface on said blocks.

2. As a new article of manufacture, a dense, homogeneous mass of raw sugar in the form of a relatively large block having a hard skin-like protective surface of the same material.

In testimony whereof I affix my signature, in presence of two witnesses.

JOHN JAMES ARMSTRONG.

Witnesses:
DAVIS L. OLESON,
ROBT. J. PRATT.

Copies of this patent may be obtained for five cents each, by addressing the "Commissioner of Patents, Washington, D. C."